United States Patent
Sumiya et al.

[11] Patent Number: 6,000,452
[45] Date of Patent: Dec. 14, 1999

[54] PNEUMATIC RADIAL TIRE FOR HEAVY LOAD WITH RUBBER FILLER COMPRISING HARD RUBBER FILLER AND SOFT RUBBER FILLER

[75] Inventors: Yoshiro Sumiya; Hiroaki Sugimoto, both of Osaka, Japan

[73] Assignee: Toyo Tire & Rubber Co., Ltd., Osaka, Japan

[21] Appl. No.: 08/940,131

[22] Filed: Sep. 29, 1997

[30] Foreign Application Priority Data

Oct. 15, 1996 [JP] Japan .................................. 8-272296

[51] Int. Cl.⁶ .............................. B60C 3/04; B60C 15/00; B60C 15/06
[52] U.S. Cl. ......................... 152/454; 152/539; 152/541; 152/543
[58] Field of Search ..................... 152/539, 541, 152/543, 454

[56] References Cited

FOREIGN PATENT DOCUMENTS

| | | | |
|---|---|---|---|
| 3-169725 | 7/1991 | Japan ..................................... | 152/541 |
| 6-001124 | 1/1994 | Japan ..................................... | 152/539 |

OTHER PUBLICATIONS

Patent Abstracts of Japan, 2–133208A, May 22, 1990, Bridgestone Corp.
Patent Abstracts of Japan, 6–64412A, Mar. 18, 1994, Bridgestone Corp.
Patent Abstracts of Japan, 6–1124A Jan. 11, 1994, Ohtsu Tire & Rubber Co Ltd.

*Primary Examiner*—Adrienne C. Johnstone
*Attorney, Agent, or Firm*—Jordan and Hamburg LLP

[57] ABSTRACT

A rubber filler in the tire bead portions is formed by a hard rubber filler having JIS A hardness of at least 85, and a soft rubber filler having JIS A hardness of 65–75. An outer end C of the interface between the hard and soft rubber fillers is placed to be higher than the upper end of a rim flange and at least 10 mm lower than an end D of a turned-up steel cord carcass, in a cross section of the bead portion of the tire. Further, $1.0\ La \leq Lb \leq 2.0\ La$, where Lb represents the distance B-E from an inner-surface-side end B of the interface between a rubber bead cover and carcass topping rubber of a carcass ply to an inner-surface-side end E of the interface between the hard and soft rubber fillers, and where La represents the distance D-A from the end D of the turned-up carcass to an outer-surface-side end A of the interface between the rubber bead cover and the carcass topping rubber.

5 Claims, 10 Drawing Sheets

TIRE TOTAL WIDTH

PNEUMATIC RADIAL TIRE FOR HEAVY LOAD WITH RUBBER FILLER COMPRISING HARD RUBBER FILLER AND SOFT RUBBER FILLER

BACKGROUND OF THE INVENTION

The present invention relates to a pneumatic radial tire for a heavy load.

Figure 4:
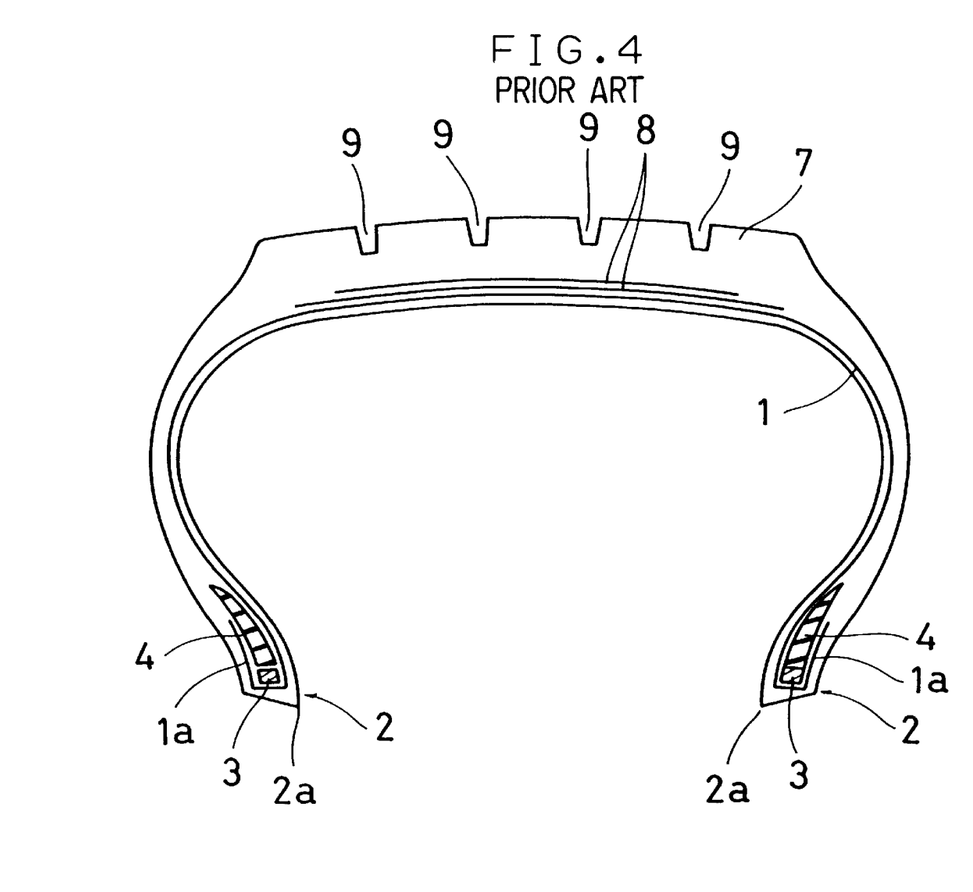
FIG. 4 is a sectional view schematically showing a common pneumatic radial tire.
Figure 6:
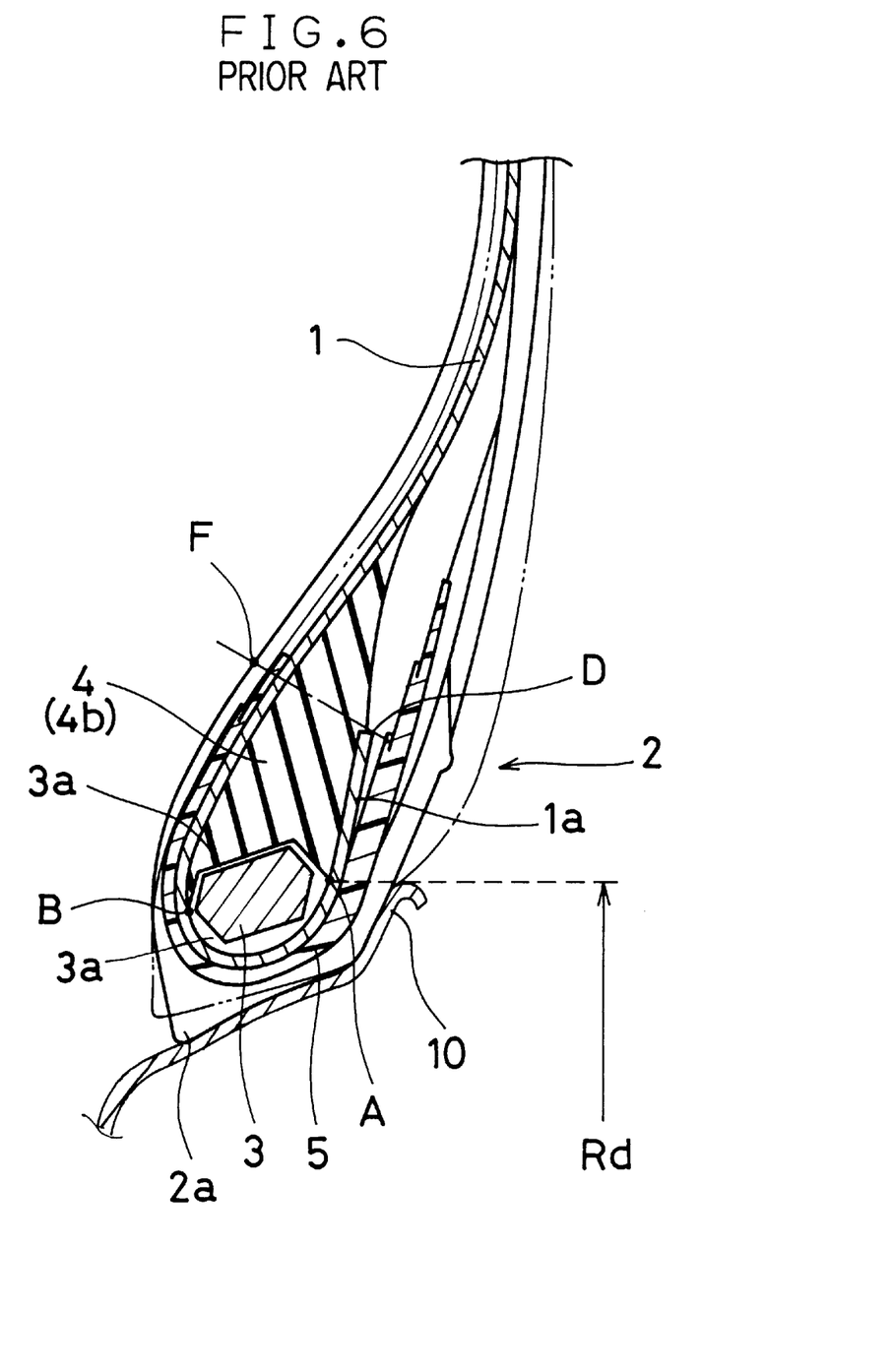
FIG. 6 is a sectional view showing a bead structure including a single rubber filler of a conventional tire.

As shown in FIGS. 4 and 6, a pneumatic radial tire generally includes at least one layer of carcass ply 1 constituted by an array of cords in the radial direction thereof, and both ends of this carcass ply 1 are anchored at bead portions 2 on both sides by being upwardly wound around bead cores 3 and rubber fillers 4 provided thereon from the inside to the outside thereof. Further, the anchoring portions are reinforced by providing them with bead portion reinforcement layers 5 called chafers having cords made of steel or organic fiber.

One or a plurality of belt layers 8 are provided outside the carcass ply 1 at a tread portion 7, and rubber layers such as side walls and tread rubber are deposited and molded on the exterior of the carcass ply 1 and the belt layer 8 to be integral therewith, thereby forming a tire. Reference numeral 9 designates main grooves provided on a circumferential surface of the tread portion 7.

As the above-described rubber fillers 4 of the bead portions 2, not only a rubber filler consisting of only one kind of rubber is used as shown in FIG. 6, but also a rubber filler 4 which is a combination of a hard rubber filler and a soft rubber filler has been proposed (for example, see JP-A-02133208 and JP-A-06064412 (Japanese unexamined patent publications No. H2-133208 and No. H6-64412)).

A tire having the above-described structure has the following problems.

When the bead cores 3 are constituted by a collection of bead wires having a circular sectional configuration, point contact occurs between the wires as the carcass ply 1 produces a moment that causes the inner ends of the bead cores to rotate outward in the radial direction of the tire, under a pressure during the application of an internal pressure and load.

When the point contact occurs, the contact points between the bead wires act like a fulcrum of a lever to move the bead cores upward. A geometrical moment of inertia of the bead cores during such rotation is very weak relative to the strength of the tire in the circumferential direction thereof. It is therefore difficult to maintain the configuration of the beads. Further, while a high tension acts on inner wires which are moved upward, the tension of outer wires is significantly reduced. Therefore, one cannot expect a uniform distribution of stress in the bead cores that is essential to maintain the configuration of the same.

Figure 7:
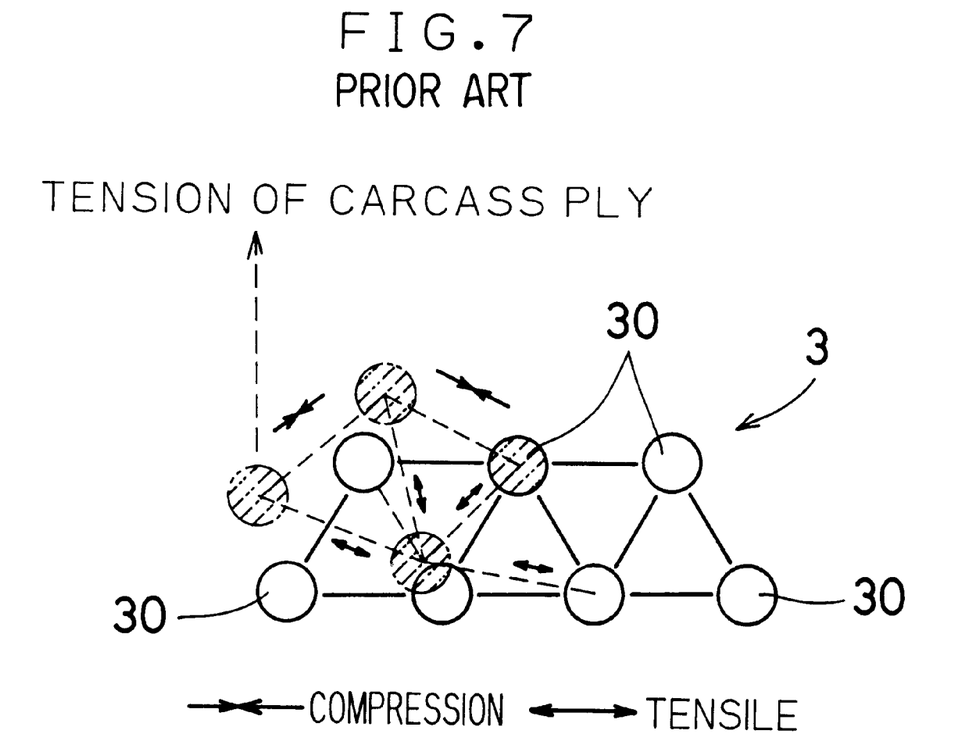
FIG. 7 illustrates distribution of stress in a section of a bead core.

In this regard, a distribution of stress in a section of a bead core having a hexagonal sectional configuration will be described with reference to a truss structure shown in FIG. 7.

A compression stress is developed in an upper outer layer of a bead core 3 due to the tension of a carcass ply in the radial direction of the tire that acts on the inner end of the bead core (the end at the inner side of the tire), and this force is dispersed by point contact between outer wires 30. A moment produced by the contact points between the outer wires acting as a fulcrum of a lever moves the inner end of the bead core upward. As a result, a tensile stress is primarily developed inside the bead core. Further, the tension of the carcass ply is concentrated on the wires that are moved upward in the vicinity of the inner end of the core rather than being dispersed. Thus, the bead core is deformed.

Figure 8:
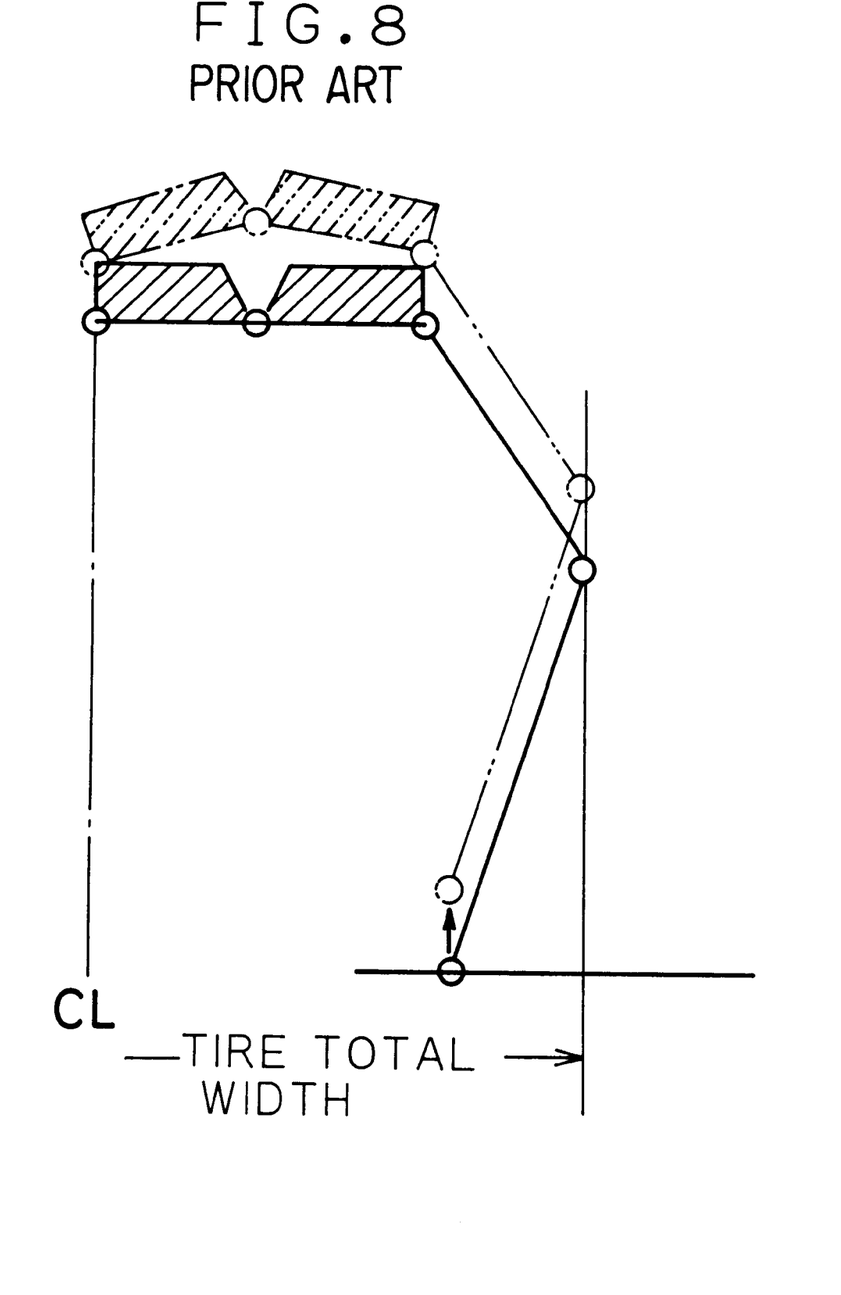
FIG. 8 illustrates growth of and changes in a carcass line of a tire starting from a bead core.

The deformation of the bead core 3 results in a reduction in the width of the base of the bead core 3 and an upward displacement of a bead toe portion 2a (indicated by the chain line in FIG. 6). This degrades air sealing between rim flanges 10 and the tire beads, thereby making an air charging operation difficult. Meanwhile, the upward displacement of the inner ends of the bead cores that serve as anchoring points for the carcass ply 1 results in a change of the periphery of carcass lines on the inner surface of the tire. An upward displacement of the ply anchoring points at the inner ends of the bead cores results in an upward displacement of the starting point of the carcass ply, which means an increase in the substantial periphery of the tire. However, it is generally known that the entire width of a tire tends to remain unchanged or decrease when the substantial periphery of the tire is increased. Therefore, a periphery that is in excess must be absorbed only by growth of the outer diameter (see FIG. 8).

Further, a change in the configuration of the inner surface of bead portions as a result of outward bulging deformation of the same after a run results in the same effect as described above and hence the rigidity of the bead portions has influence on a tread crown portion. For example, when the bead portions are deformed so as to bulge outwardly as a result of growth of the outer diameter of the tire after a run relative to the bead configuration before the growth of the outer diameter as indicated by the chain line in FIG. 6, such bulging can cause an upward displacement of the bead toe portion 2a which leads to an excess periphery as described above.

Figure 5:
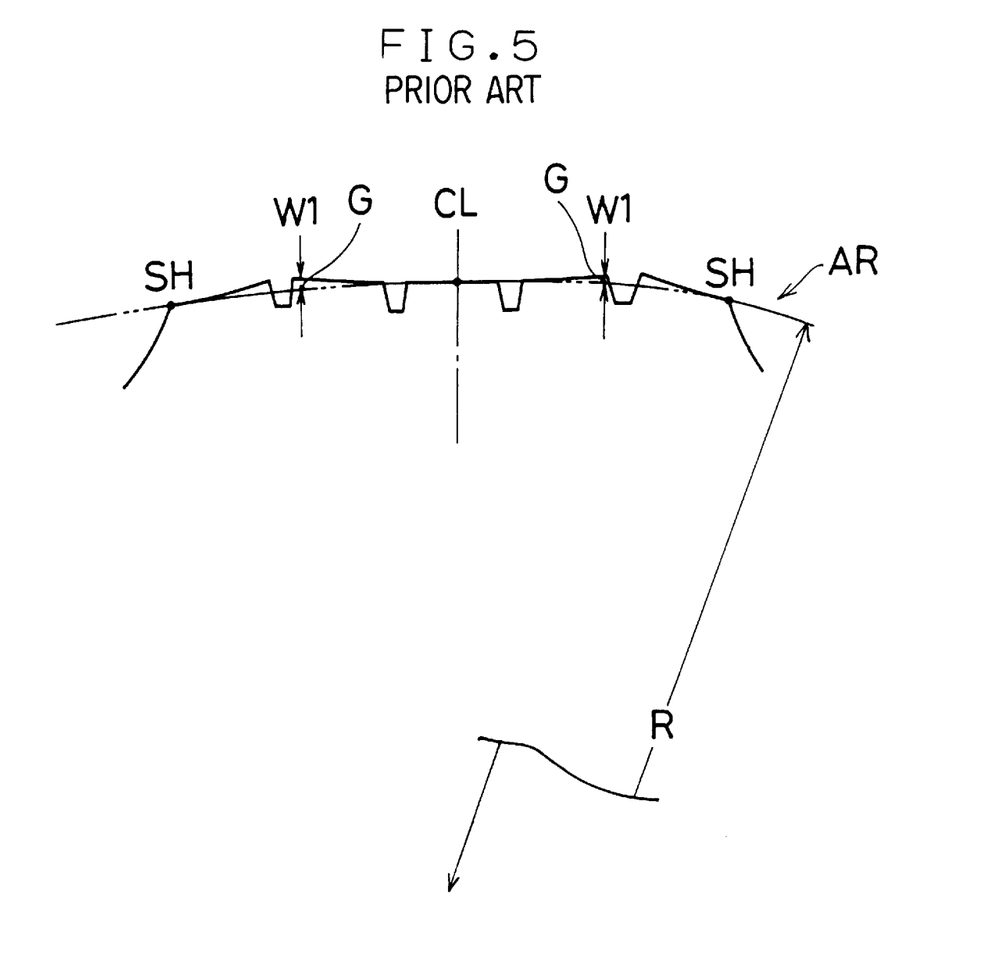
FIG. 5 illustrates the radius of curvature of a tread portion of a tire and the amount of protrusions in the vicinity of quarter points.

The absorption of an excess periphery by the growth of the outer diameter as described above is supplemented by growth of the regions at both ends of the belt layer 8 which have a low hooping effect and low rigidity. As shown in FIG. 4, the both ends of the belt layer 8 are located in the vicinity of points G aparted from ends of a ground contact of the tire by a quarter of a width of the ground contact (hereinafter referred to as quarter points) and is substantially aligned with the outermost main grooves 9. Since the rigidity of the wheel tread of the tire is lowest at the regions of the main grooves 9, growth of the outer diameter occurs at the main grooves 9 in the vicinity of the above-described quarter points as starting points. For example, the tire tread crown bulges as shown in FIG. 5. This takes the form of protrusions W1 in the vicinity of the quarter points G of the tread crown as encountered on a tire after growth and is a phenomenon that is more significant on a low aspect tire. Further, the above-described protrusions W1 in the vicinity of the quarter points G can cause the formation of a crown configuration having sloping shoulders which is susceptible to irregular wear abrasion.

Meanwhile, a conventional rubber filler which is a combination of a hard rubber filler and a soft rubber filler is intended for suppressing only the movement of bead cores, or intended for improving only the durability of bead portions by suppressing inclination of the same, and is not directed to prevention of protrusion arised at quarter points of a tread crown. Therefore, it has not be satisfactory in preventing such protrusions W1.

The present invention has been conceived taking the above-described points into consideration, and it is an object of the invention to suppress upward displacements of bead toe portions 2a and carcass ply anchoring points as a result of outward bulging deformation of bead portions by the use of hard rubber fillers 4a at above bead cores 3, thereby preventing protruding deformation W1 in the vicinity of quarter points G as a result of growth of the outer diameter of a tread crown and further preventing an increase in rolling resistance and excess heat generation.

SUMMARY OF THE INVENTION

In order to solve the above-described problems, the present invention is characterized in that a sheet of carcass constituted by steel cords in carcass topping rubber is turned around a bead core and a rubber filler above the bead core, from tire's-inner-surface side (side facing toward tire's inner surface) of the bead core and rubber filler to tire's-outer-surface side (side facing toward tire's outer surface) thereof, and turned up to be anchored to the bead core and rubber filler in cross section of a bead portion of the tire; said rubber filler comprises a hard rubber filler adjacent to said bead core and a soft rubber filler continuous with said hard rubber filler, and said hard rubber filler and soft rubber filler are made of rubber materials exhibiting hardness of at least 85 and hardness in the range from 65 to 75, respectively, at an A spring-type hardness test as defined in JIS K 6301; a tire's-outer-surface-side end (end facing toward tire's outer surface) C of the interface between said hard rubber filler and soft rubber filler (namely, outer end C of the filler interface), in said sectional view of a bead portion of the tire, is positioned to be higher than the upper end of a rim flange and at least 10 mm lower than an end D of the turned-up carcass when the tire is mounted on a standard rim; and $1.0 \text{ La} \leq \text{Lb} \leq 2.0 \text{ La}$ is satisfied where Lb represents the distance B-E from a tire's-inner-surface-side end (end facing toward tire's inner surface) B of an interface between a rubber bead cover that entirely encloses said bead core and carcass topping rubber to a tire's-inner-surface-side end E of the interface between said hard rubber filler and soft rubber filler (namely, Lb represents the width B-E of the hard rubber filler on the side of the inner surface of the tire), and where La represents the distance D-A from the end D of said wound carcass to a tire's-outer-surface-side end A of the interface between said bead cover and said carcass topping rubber (namely, La represents a carcass turned-up width D-A).

By setting the elevation of the outer end C of the filler interface as described above, it is possible to prevent the hard rubber filler from generating excess heat and prevent separation which is otherwise caused by a strain due to a stress concentrated at the end D of the wound carcass ply 1. Further, no increase occurs in rolling resistance.

In addition, by setting the relationship between the width Lb of the hard rubber filler on the side of the tire inner surface and the carcass turned-up width La as expressed by the above expression, it is possible to achieve both of the effects of maintaining rigidity and suppressing heating. Particularly, a stress applied to the hard rubber filler can be dispersed by the rim flange supporting the same, and this makes it possible to suppress excessive bulging deformation of the bead portion due to growth after a run and to reduce an upward displacement of a bead tow portion.

Especially, according to a second aspect of the invention, the end C of the interface between the hard rubber filler and the soft rubber filler toward the outer surface of the tire is set at a position at least 5 mm higher than the upper end of the rim flange, which is particularly preferable from the viewpoint of the effects of dispersing a stress to the rim flange and suppressing rolling resistance.

Further, according to a third aspect of the invention, content of the above-described hard rubber filler in the rubber filler as a whole is at least 30% by volume.

This ensures that the bead portion 2 has sufficient rigidity.

DETAILED DESCRIPTION OF PREFERRED EMBODIMENTS

Preferred embodiments of the present invention will now be described with reference to the drawings.

Figure 1:
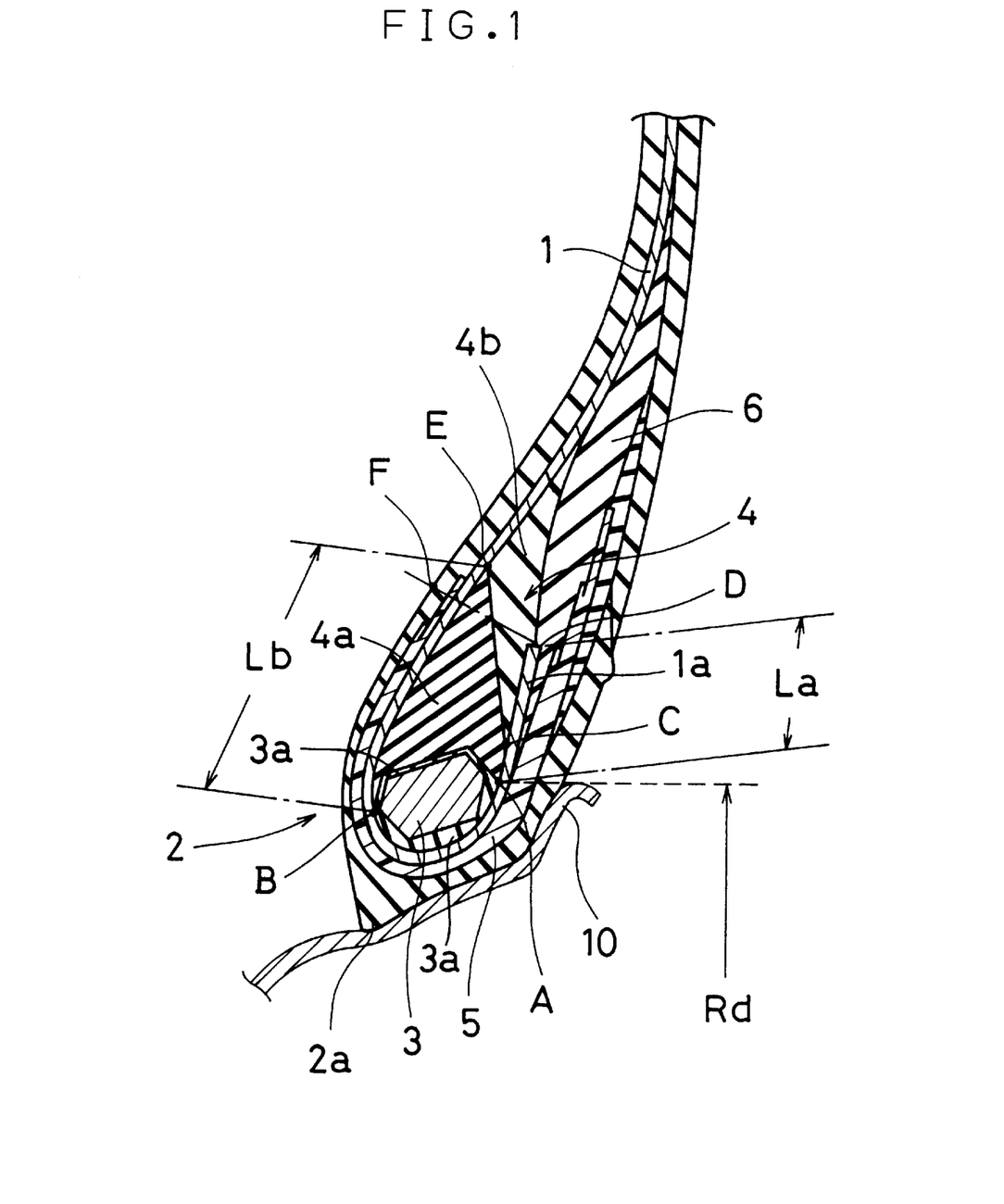
FIG. 1 is a sectional view of a bead portion showing an embodiment of the present invention.
Figure 2:
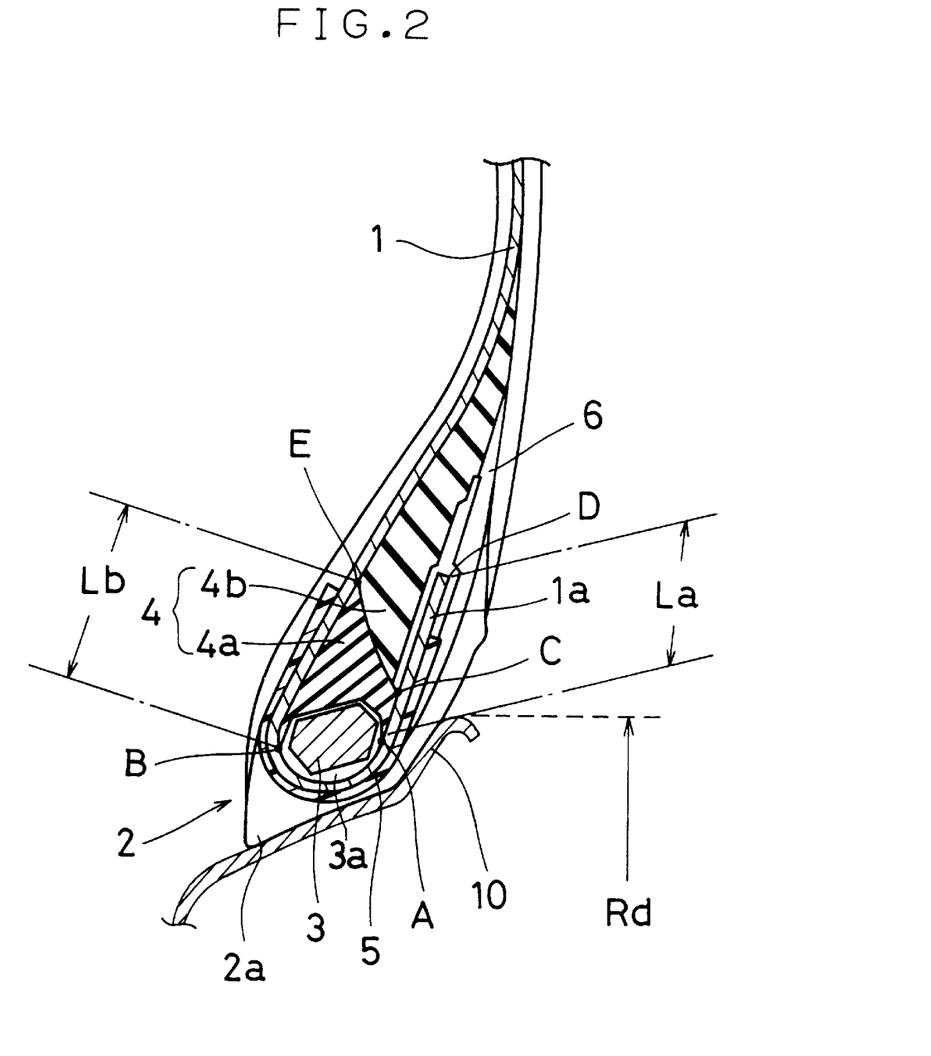
FIG. 2 is a sectional view of a bead portion showing another embodiment of the present invention.
Figure 3:
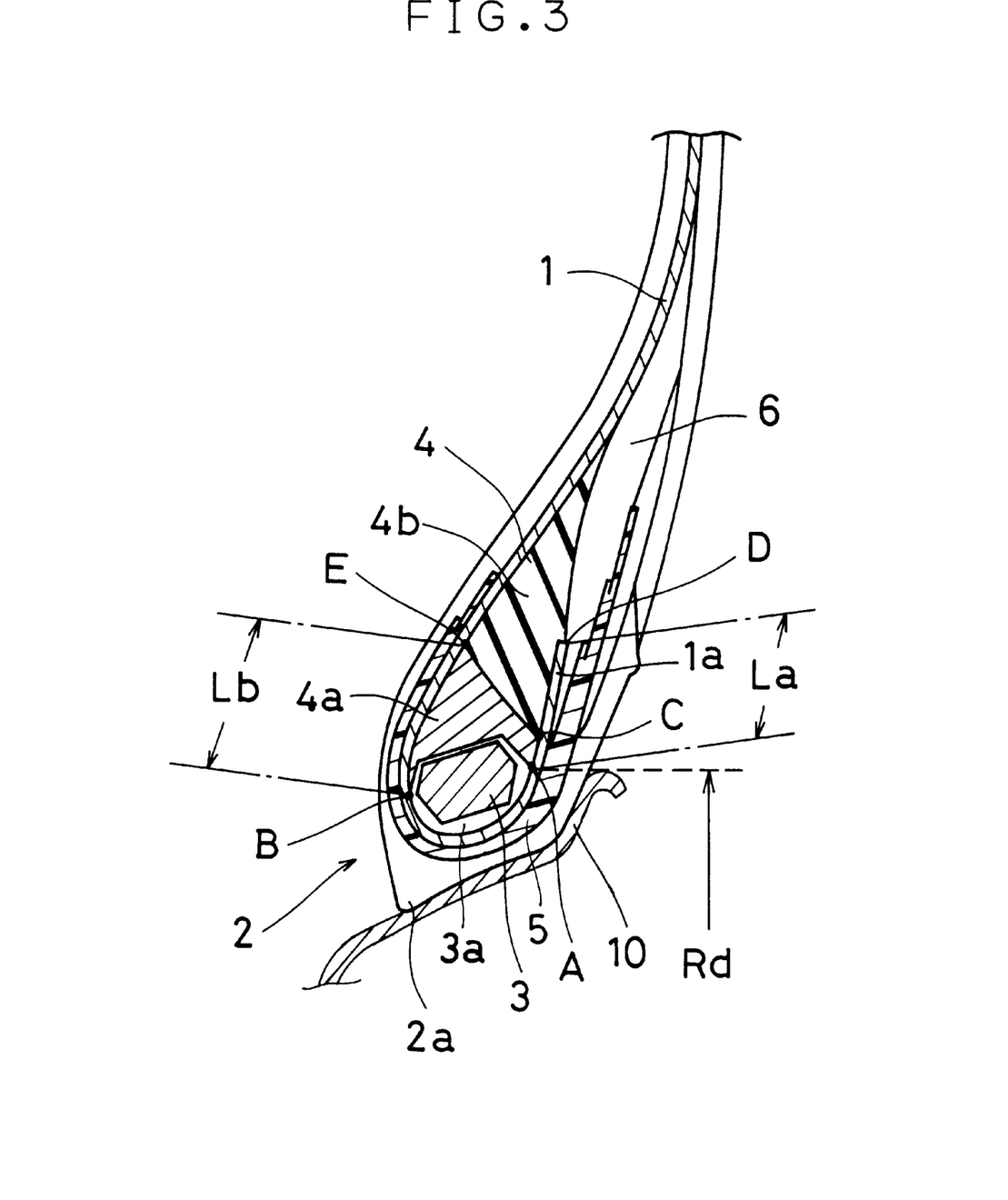
FIG. 3 is a sectional view of a bead portion showing a still another embodiment of the present invention.

Each of FIGS. 1 through 3 is a sectional view of a bead portion in embodiments of the present invention. The upper side of these sectional views corresponds to the outer side of a tire in the radial direction thereof. In this specification, "upper side" refers to the upper side in those drawings.

Reference numeral 1 designates a carcass comprising one layer of ply constituted by steel cords arranged in the radial direction of the tire. Reference numeral 2 designates a bead portion. Reference numeral 3 designates a bead core which is a collection of bead wires located in the middle of the bead portion. A rubber layer referred to as "bead cover 3a" is provided around the bead core 3 so as to cover the core as a whole. Reference numeral 4 designates a rubber filler having a deformed triangular sectional configuration which is provided above the bead core in contact therewith and which extends in the radial direction of the tire. Reference numeral 5 designates a bead portion reinforcement layer referred to as "chafer" including steel cords or organic fiber cords.

FIGS. 1 and 3 show a case wherein the bead portion reinforcement layer 5 is constituted by three reinforcement layers having organic fiber cords, and FIG. 2 shows a case wherein the bead portion reinforcement layer 5 is constituted by one reinforcement layer including steel cords. 6 designates strip rubber.

The above-described rubber filler 4 is constituted by a hard rubber filler 4a provided on the bead core 3 adjacent thereto and a soft rubber filler 4b continuous with the hard rubber filler 4a.

The hard rubber filler 4a is made of a rubber material having hardness of at least 85, preferably 90 or more, at a spring-type hardness test as defined in JIS K 6301 (at 25° C. using an A-spring type hardness tester).

If the hardness of the hard rubber filler 4a is less than 85, the use of the hard rubber material will not provide a sufficient effect of maintaining rigidity.

The upper limit for the hardness of the hard rubber filler 4a is 95, preferably 87, in terms of hardness at an A-spring type hardness test as defined in JIS K 6301. It is not preferable that the hard rubber filler 4a has hardness of 92 or more because a rigidity difference at the boundary with soft rubber filler having hardness of 75 is significant. Especially, hardness of 96 or more will result in a problem of malfunction due to shear stress applied at the boundary with soft rubber filler.

The soft rubber filler 4b is made of a rubber material that exhibits hardness in the range from 65 to 75 at the above-described hardness test. If the hardness of the soft rubber filler 4b is less than 65, it is not possible to obtain rigidity required to suppress outward bulging of the bead portion 2. Hardness exceeding 75 will result in too high rigidity which leads to the problem of heat generation.

As shown in FIGS. 1 through 3, the carcass ply 1 is turned around the bead core 3, and then, the end part of the ply is turned up along the outer face of rubber filler 4 facing toward tire's outer surface, to be anchored to the outer face of rubber filler 4. Reference numeral 1a designates such a turned-up portion, and D designates the end of the turned-up portion.

The turned-up portion 1a is preferably terminated in a position lower than the upper end of the rubber filler 4 as shown in FIGS. 1 through 3 because this will prevent any effect of the upper end part of the turned-up portion 1a from appearing on the surface of the tire. In this case, the end D of the turned-up portion is set to be at least about 10 mm higher than the upper end of the bead core 3. A dimension smaller than this will not provide a sufficient anchoring of the carcass ply by the turn-around and turn-up along the bead core and the bead filler.

As in the conventional tire shown in FIG. 4, one or a plurality of belt layers 8 are provided outside the carcass ply 1 at the tread portion of the tire, and a belt reinforcement layer may be provided further as needed. Further, a tread pattern including a plurality of main grooves in the circumferential direction of the tire is formed on an outer circumferential surface formed by tread rubber provided outside thereof.

The interface between the hard rubber filler 4a and the soft rubber filler 4b forming the above-described rubber filler 4 is set such that the following conditions are satisfied.

For the interface between the hard rubber filler 4a and the soft rubber filler 4b, an end C toward the outer surface of the tire (tire's-outer-surface-side end of the interface, or outer end of the filler interface) in cross section of the bead portion 2 of the tire as described above is set to be higher than the upper end of a rim flange 10 and at least 10 mm lower than the end D of the turned-up potion of carcass.

By setting the outer end C of the filler interface in a position higher than the upper end of the rim flange 10, any stress resulting from deformation of the bead portion caused by growth during a run can be effectively dispersed to the rim flange. Especially, setting at a position at least 5 mm higher than the upper end of the rim flange 10 is preferable from the viewpoint of the effect of stress dispersion.

Meanwhile, if the outer end C of the filler interface is too higher than the above-described range which is at least 10 mm lower than the end D of the wound carcass, bulging deformation resulting from the growth of the outer diameter causes the boundary between the hard rubber filler and the soft rubber filler to become noticeable as relief pattern on the outer surface of the bead portion 2, resulting from the difference in rigidity therebetween. Further, since deformation of side portions of the tire that occurs during the rolling of the tire is suppressed, there will be an increase in rolling resistance (RR). Moreover, the hard rubber filler generate heat more easily.

By setting the height of the outer end C of the filler interface in the above-described range, it is possible to prevent the hard rubber filler from generating excess heat to prevent separation which is otherwise caused by a strain due to a stress concentrating on the turned-up end of the carcass ply.

As shown in FIGS. 1 through 3, a setting is made to satisfy $1.0 \, La \leq Lb \leq 2.0 \, La$ where Lb represents the distance B-E from a tire's-inner-surface-side end B of an interface between the bead cover 3a that entirely encloses the bead core 3 and carcass topping rubber of the carcass ply 1 to a tire's-inner-surface-side end E of the interface between the hard rubber filler and the soft rubber filler, and where La represents the distance D-A from the end D of the turned-up carcass to a tire's-outer-surface-side end A of the interface between the bead cover 3a and the carcass topping rubber of the carcass ply 1.

By setting the relationship between the width Lb of the hard rubber filler on the side of the tire inner surface and the carcass turned-up width La as expressed by the above expression, it is possible to achieve both of the effects of maintaining rigidity and suppressing heating.

Specifically, bulging deformation of the bead portion toward the outer surface of the tire resulting from growth during a run in comparison to the bead configuration before the growth is at a maximum in a position slightly higher than a point F where a straight line extending through the carcass ply turned-up end D and perpendicularly to the carcass line crosses the inner surface of the tire as shown in FIG. 6.

Therefore, in order to increase rigidity in the vicinity of the crossing point F, the relationship between the width Lb of the hard rubber filler on the side of the tire inner surface and the carcass turned-up width La is set such that $1.0 \, La \leq Lb$ is satisfied. Further, the greater the width Lb of the hard rubber filler on the side of the tire inner surface, the more easily the hard rubber filler 4a generates heat. Therefore, a setting is made such that $Lb \leq 2.0 \, La$ is satisfied in order to prevent excess heat generation.

The interface between the hard rubber filler 4a and the soft rubber filler 4b in the cross section of the bead portion 2 (indicated by the line E-C in FIG. 1–3) is not limited to the substantially straight configuration or a slightly curved configuration as shown, and it may be modified to have a zigzag, wavy or irregular configuration in that sectional view.

The content of the hard rubber filler 4a in the rubber filler 4 as a whole is preferably at least 30% by volume in order to achieve an effect of improving the rigidity of the bead portion. The content of the hard rubber filler 4a, even at its maximum, is to be within a range in which it satisfies the above expression for the setting of the inner and outer ends of the hard rubber filler and in which it does not cause the problem of heat generation.

In a pneumatic radial tire having the above-described configuration, bulging deformation of the bead portion toward the outer surface of the tire occurred by the application of the internal pressure and by growth during a run can be effectively suppressed because appropriate rigidity can be maintained at the bead portion by the hard rubber filler 4a provided on the bead core 3 adjacent thereto. At the interface E-C between the hard rubber filler 4a and the soft rubber filler 4b continuous therewith, since the ends E and C toward the inner and outer surfaces of the tire, respectively, are set as described above to position the end C toward the tire outer surface higher than the upper end of the rim flange 10, deforming stress exerted on the hard rubber filler 4a can be supported by the rim flange 10. Further, the same stress can be distributed to the rim flange 10 to effectively suppress bulging deformation resulting from growth during a run.

This makes it possible to prevent deformation of the inner end of the bead core 3, i.e., an upward displacement of the anchoring point of the carcass ply 1, thereby suppressing change in the periphery of the carcass line. Consequently, this makes it possible to suppress protrusion as a result of growth of the outer diameter of the tread crown, especially growth of the outer diameter of tire in the vicinity of quarter points G of the tread crown.

In addition, since the tire's-outer-surface-side end C of the above-described interface is positioned at least 10 mm lower than the turned-up end D of the carcass ply 1, it is possible, during a run to prevent the hard rubber filler 4a from fluctuating too significantly, to prevent the generation of excess heat and the concentration of stress and strain on the end of the ply, and to prevent any increase in rolling resistance (RR).

For example, a pneumatic tire for a heavy load according to the present invention when the tire is mounted on a standard rim and inflated to a standard inner pressure has an outer diameter in the range from 25 to 55 inches, a total width in the range from 7 to 25 inches, and a rim diameter in the range from 15 to 24.5 inches. However, the present invention is not limited to such ranges.

As described above, in a pneumatic tire according to the present invention, excessive bulging deformation of the bead portion 2 resulting from growth during a run can be suppressed, and upward displacement of the bead toe portion 2a can be reduced. This makes it possible to reduce the change in the periphery of the carcass line and therefore to suppress growth of the outer diameter of the tread crown. Especially, protruding deformation in the vicinity of the quarter points G of the tread can be prevented. Thus, no reduction due to deformation will be made in the durability and resistance to irregular wear abrasion of the tire.

In addition, since the width La and Lb of the hard rubber filler toward the outer and inner surfaces of the tire, respectively, are limited, it is possible to suppress excess heat generation of the hard rubber filler and increase in rolling resistance.

Such effects will be more significant when the setting according to the second or third aspect as previously described is employed.

The above-described effects are obvious also from the results of a test that compares examples of the invention with comparative examples as shown in Table 1 below.

Examples 1 through 3 of the invention and comparative examples 1 through 3 are tires having respective settings as shown in the Table 1 with respect to the configuration of the bead portion reinforcement layer, the hardness of the rubber fillers, the content of the hard rubber filler in the rubber filler as a whole (vol. %), and the interface C-E between the hard rubber filler and the soft rubber filler. Measurement was made on rolling resistance (RR) and growth during a run at JATMA 100% single load using an in-door tire drum tester.

Figure 9:
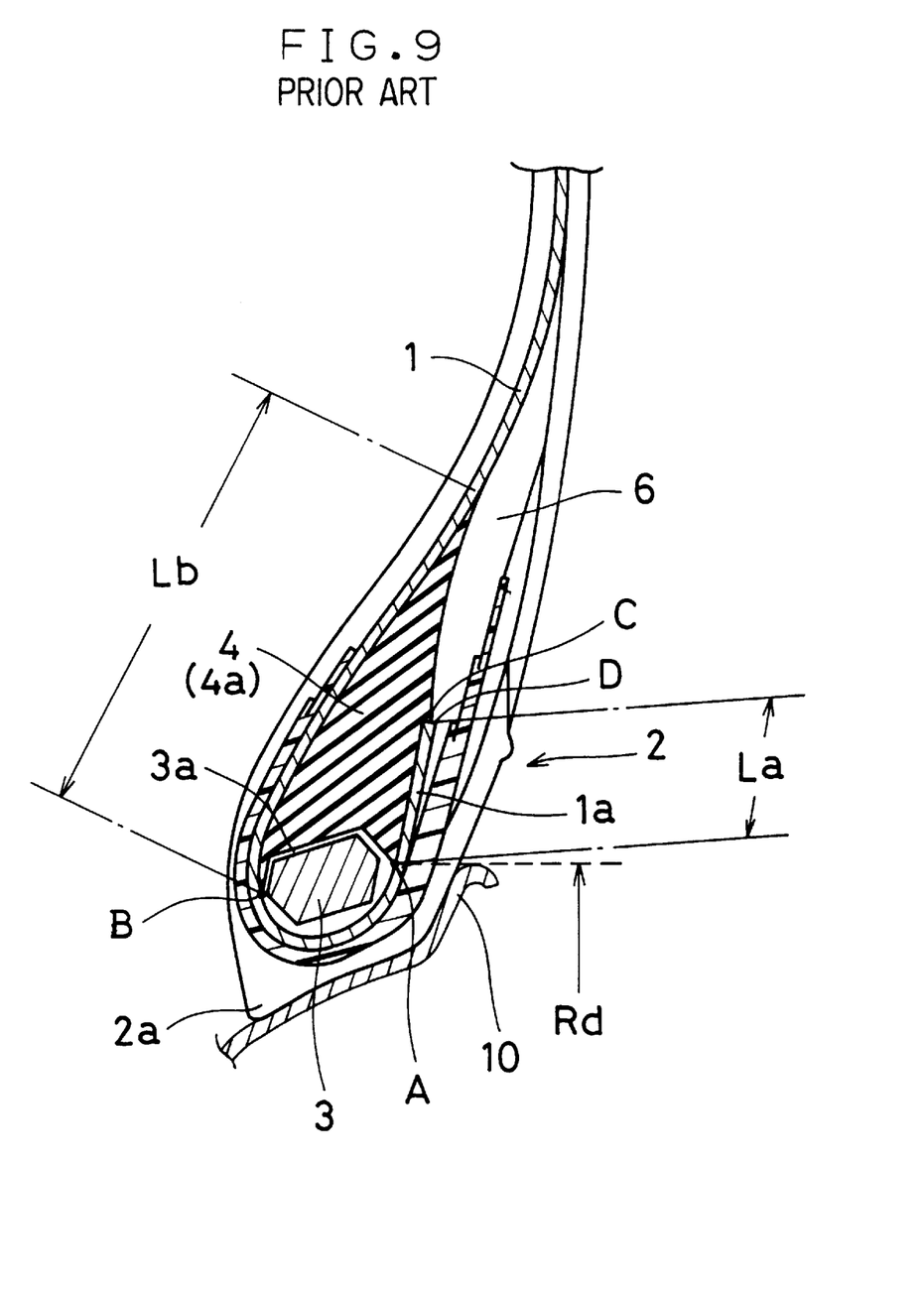
FIG. 9 is a sectional view showing a bead structure including a single rubber filler made of hard rubber.
Figure 10:
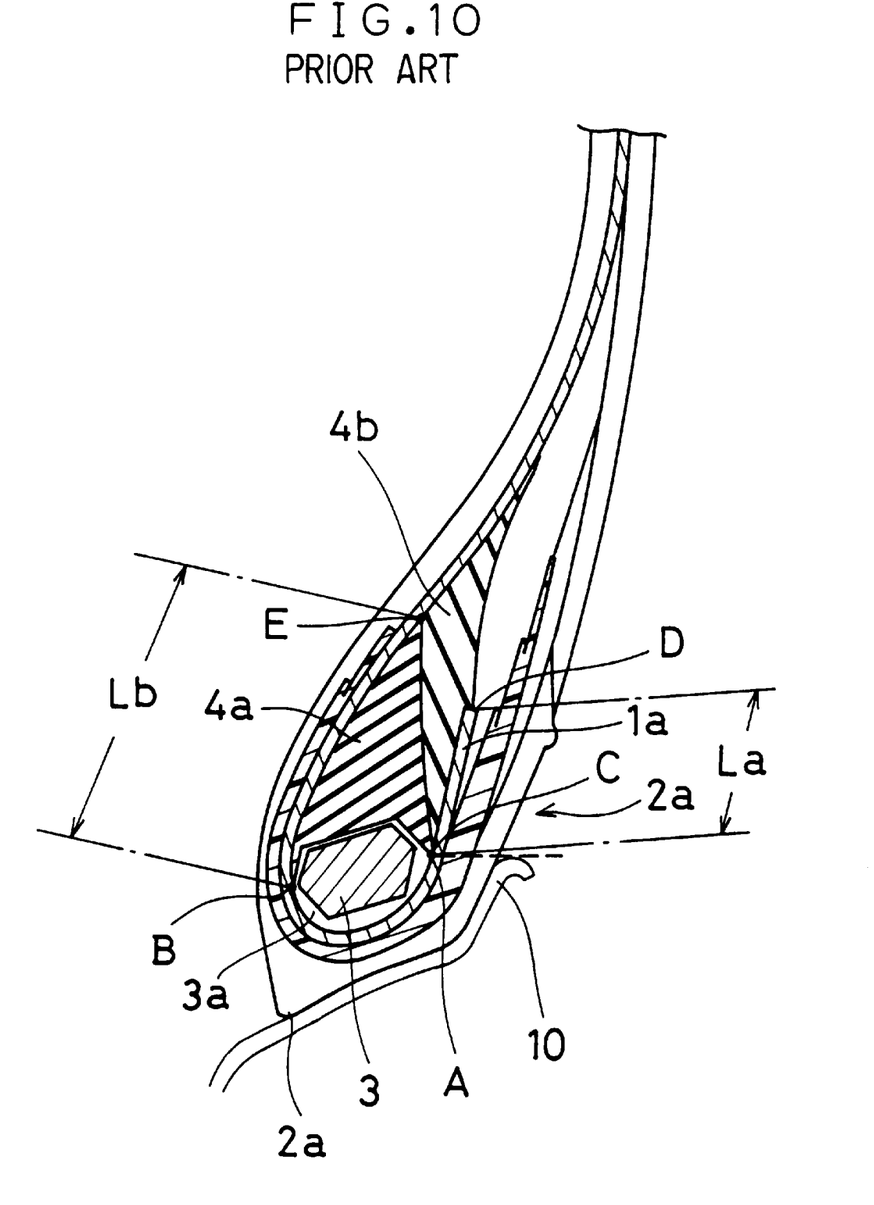
FIG. 10 is a sectional view showing a conventional bead structure including a rubber filler which is a combination of a hard rubber filler and a soft rubber filler.

The examples 1 through 3 are tires having the bead structure as shown in the sectional views of FIGS. 1 through 3, respectively. The comparative example 1 is a conventional tire having the bead structure as shown in FIG. 6 whose rubber filler is constituted by a single rubber element. The comparative examples 2 and 3 are tires having the bead structure as shown in FIGS. 9 and 10, respectively.

All of the tires of the examples and the comparative examples are a tire of 11R22.514PR having a rim diameter of 22.5×7.50 inches and are completely the same in belt structure and other structure except for the bead portions. The test was carried out by applying internal pressures and loads to them in accordance with the standard depending on the tire sizes.

As to rolling resistance, rolling resistance was measured after a run for one hour at a speed of 60 km per hour, and the resultant measurements are shown as indices, with the comparative example 1 (FIG. 6) being 100.

As to growth during a run, the radius of curvature R of an arc AR connecting three points, i.e., the center CL of the tread and the shoulders SH on both ends in FIG. 5 was measured after a run for 12 hours at a speed of 88 km per hour, and the amount of protrusion W1 in the vicinity of the quarter points G was measured using the arc AR as a reference. Table 1 shows the results of such measurements.

TABLE 1

|  | Ex. 1 (FIG. 1) | Ex. 2 (FIG. 2) | Ex. 3 (FIG. 3) | Comp. Ex. 1 (FIG. 6) | Comp. Ex. 2 (FIG. 9) | Comp. Ex. 3 (FIG. 10) |
| --- | --- | --- | --- | --- | --- | --- |
| Configuration of Bead Reinforcement Layer 5 | 3 plys nylon | 1 ply steel | 3 plys nylon | 3 plys nylon | 3 plys nylon | 3 plys nylon |
| Hard Filler 4a / Entire Filler 4 (vol. %) | 63 | 40 | 30 | 0 | 100 | 60 |
| Hardness of Hard Filler 4a | 90 | 90 | 90 | — | 90 | 90 |
| Hardness of Soft Filler 4b | 70 | 70 | 70 | 70 | — | 70 |
| Height (mm) of Outer End of Filler Interface C from Upper end of Rim Flange 10 | 5 | 5 | 5 | — | 21 | 0 |
| Carcass Turned-Up Width Lb / Inner Width of Hard Rubber Filler La | 2.0 | 1.28 | 1.1 | — | 3.4 | 2.0 |
| Rolling Resistance RR (Indices) at Run Test | 91 | 92 | 94 | 100 (reference) | 99 | 91 |
| Radius of Curvature R (mm) between 3 Points on Tread | 520 | 540 | 580 | 580 | 550 | 580 |
| Protrusion W1 (mm) at Tread Quarter Points G | −0.4 | 0 | 0.4 | 1.0 | −0.4 | 0.8 |

As apparent from the above test results, the problem of protrusion in the vicinity of the quarter points G of the tread due to growth during a run is most significant for the conventional tire as the example 1 for comparison. The comparative example 2 comprising a single rubber filler made of hard rubber having hardness of 90 has the problem of heat generation and increase in rolling resistance due to the behavior of the hard rubber filler. The amount of protrusion W1 in the vicinity of the quarter points of the tread due to growth during a run is also significant for the example 3 for comparison which is a combination of a hard rubber filler and a soft rubber filler.

In contrast, in each of the embodiments 1 through 3 of the present invention, the protrusion in the vicinity of the quarter points of the tread due to growth during a run is suppressed and no increase in rolling resistance is observed.

What is claimed is:

1. A pneumatic radial tire for a heavy load, comprising:

a sheet of carcass constituted by steel cords in carcass topping rubber turned around a bead core and a rubber filler above the bead core in each of a pair of bead portions of the tire, from tire's-inner-surface side of the bead core and the rubber filler to tire's-outer-surface side thereof, and turned up to be anchored to the bead core and the rubber filler in cross section of each bead portion of the tire;

said rubber filler comprising a hard rubber filler adjacent to said bead core and a soft rubber filler continuous with said hard rubber filler, and said hard rubber filler and soft rubber filler being made of rubber materials exhibiting JIS A hardness of at least 85 and JIS A hardness in the range from 65 to 75, respectively;

a tire's-outer-surface side end C of the interface between said hard rubber filler and soft rubber filler, in said cross sectional view of each bead portion of the tire, being positioned to be higher than the upper end of a rim flange and at least 10 mm lower than an end D of the turned-up carcass when the tire is mounted on a standard rim; and $1.0 \, La \leq Lb \leq 2.0 \, La$ is satisfied where Lb represents the distance B-E from a tire's-inner-surface side end B of an interface between a rubber bead cover that entirely encloses said bead core and said carcass topping rubber to a tire's-inner-surface side end E of the interface between said hard rubber filler and soft rubber filler, and where La represents the distance D-A from the end D of said turned-up carcass to a tire's-outer-surface side end A of the interface between said rubber bead cover and said carcass topping rubber.

2. The pneumatic radial tire for a heavy load according to claim 1, wherein, in said cross section of each bead portion of the tire, said tire's-outer-surface-side end C of the interface between said hard rubber filler and soft rubber filler is positioned to be at least 5 mm higher than the upper end of said rim flange.

3. The pneumatic radial tire for a heavy load according to claim 2, wherein content of said hard rubber filler in said rubber filler as a whole is at least 30% by volume.

4. The pneumatic radial tire for a heavy load according to claim 1, wherein content of said hard rubber filler in said rubber filler as a whole is at least 30% by volume.

5. The pneumatic radial tire for a heavy load according to any one of claims 1 through 3, wherein when said tire is mounted on a standard rim and inflated to a standard inner pressure said tire has an outer diameter in the range from 25 to 55 inches, a total width in the range from 7 to 25 inches, and a rim diameter in the range from 15 to 24.5 inches.

* * * * *